United States Patent [19]

Geiss et al.

[11] 3,863,707

[45] Feb. 4, 1975

[54] METHOD FOR STABILIZING THE TEMPERATURE OF AN INSTRUMENT, PARTICULARLY OF A WRIST WATCH

[75] Inventors: Johannes Geiss, Hinterkappelen; Peter Eberhardt, Gumligen, both of Switzerland

[73] Assignee: OMEGA Louis Brandt & Frere S.A., Bienne, Switzerland

[22] Filed: Feb. 14, 1972

[21] Appl. No.: 225,772

[30] Foreign Application Priority Data
Feb. 14, 1971 Switzerland.......................... 2729/71

[52] U.S. Cl............................ 165/1, 58/53, 73/431
[51] Int. Cl.............................................. F28b 3/00
[58] Field of Search.............. 165/104, 1; 73/431 X; 62/437; 58/53 X, 88 W, 88 R; 252/67

[56] References Cited
UNITED STATES PATENTS
3,265,893  8/1966  Rabson et al..................... 250/71.5

3,289,743  12/1966  Biro................................. 165/104 X
3,596,713  8/1971  Katz.................................... 165/107
3,704,359  11/1972  Laing............................... 165/104 X Primary Examiner—Edward G. Favors
Attorney, Agent, or Firm—Imirie, Smiley & Linn

[57] ABSTRACT

The present invention relates to a method for stabilizing the temperature of an instrument which consists in that the instrument whose temperature has to be stabilized, is brought into contact with a container containing a temperature stabilizing element which presents, in the considered temperature range, at least one transformation point, so that the latent heat of transformation, which produces an elevation of the calorific capacity at the time of the passage through the transformation point, stabilizes the temperature of the instrument.

5 Claims, 4 Drawing Figures

METHOD FOR STABILIZING THE TEMPERATURE OF AN INSTRUMENT, PARTICULARLY OF A WRIST WATCH

BACKGROUND OF THE INVENTION

The present invention relates to a method for stabilizing the temperature of an instrument.

When a measuring instrument is used under extreme temperature conditions, e.g. in astronautics, the problem is to stabilize its temperature, because of the fact that excessive temperatures can disturb the correct measures of a measuring instrument. In the space, an instrument is successively submitted to sun radiation and spatial dark, so that the temperature of the instrument would continually change, if no temperature stabilizing measures are provided.

SUMMARY OF THE INVENTION

It is one object of the invention, to overcome this difficulty.

Another object of the invention is, to provide a method for stabilizing the temperature of an instrument. Accordingly, the invention provides a method which consists in that the instrument whose temperature has to be stabilized, is brought into contact with a container containing a temperature stabilizing element which presents, in the considered temperature range, at least one transformation point, so that the latent heat of transformation, which produces an elevation of the calorific capacity at the time of the passage through the transformation point, stabilizes the temperature of the instrument.

For a further understanding of the invention, reference should be had to the following detailed description taken in connection with the accompanying drawings:

DETAILED DESCRIPTION OF THE INVENTION

Figure 1:
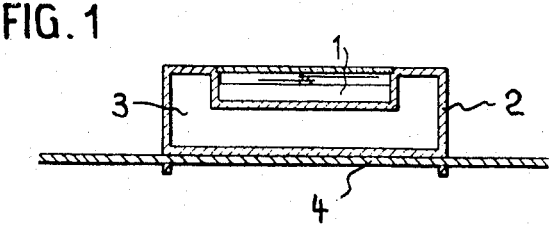
FIG. 1 shows a schematic view of a watch associated to a container containing the stabilizing element.

In FIG. 1 there is schematically represented a wrist watch 1 placed in a box 2 which constitutes a container containing a temperature stabilizing element 3. The container 2 can be fixed to an astronaut-dress or something else in a manner similar to a wrist watch, because of the fact that it is mounted on a flexible wristlet 4 or the like. The container 2, as well as the dial of the watch 1, has predetermined optical properties, particularly a predetermined optical absorptance and emittance and optical reflectance, as will be explained below. It is most important that the instrument, or in this case the watch movement 1, is in tight contact with the container 2, because it is this contact which ensures a good thermal conductivity between the instrument and the container 2.

The fact that the box 2 contains a temperature stabilizing element 3, which has a transformation point (e.g. the melting point) in the considered temperature range, does not influence the stability temperature of the watch 1. This means that the temperature of the watch after a long journey in space, is not defined by the temperature stabilizing element 3.

Figure 3:
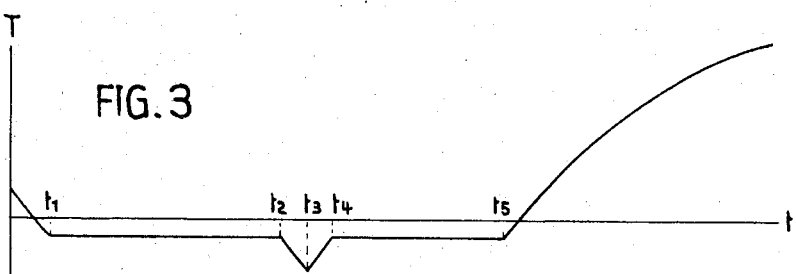
FIG. 3 represents the variation of the temperature of the same measuring instrument in contact with a temperature stabilizing means containing one temperature stabilizing element and FIG. 4 shows the variation of the temperature of again the same measurement instrument, this time in contact with a temperature stabilizing means containing two different temperature stabilizing elements.
Figure 4:
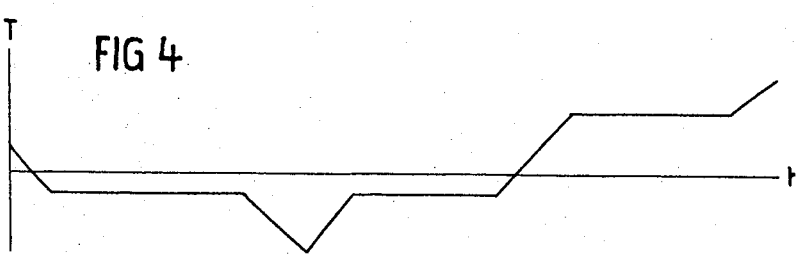

Thereagainst, if the unit 1, 2 is submitted to a temperature change, the temperature of the temperature stabilized measuring instrument will be constant at the temperature of the transformation point of the temperature stabilizing element 3, until the whole element 3 has reached this temperature and executed the transformation. It is obvious that the temperature of the watch will vary along the graph in FIG. 3.

Figure 2:
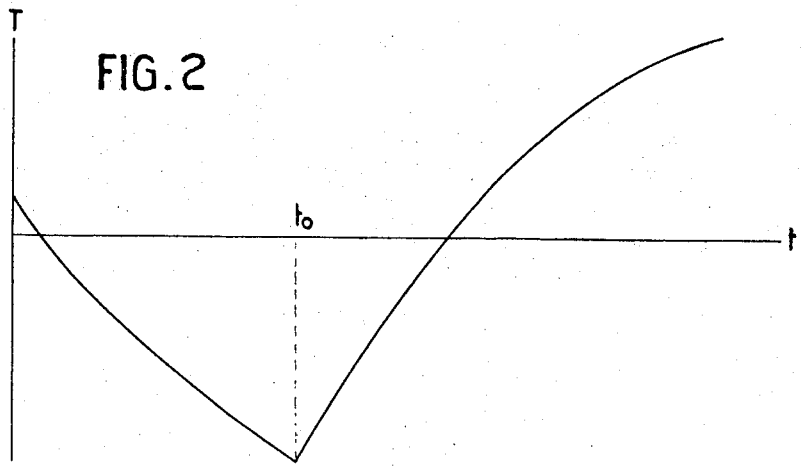
FIG. 2 shows the variation of the temperature of a measuring instrument not in contact with the temperature stabilizing means.

Supposing that the watch, which is not in contact with the temperature stabilizing means, is suddenly submitted to the cold, e.g. to the dark in space, its temperature will rapidly decrease until, at the time $t_o$, it is suddenly submitted to the heat, e.g. to the sun in the space. Its temperature starts then to rise rapidly, as it is shown in FIG. 2. Due to these variations of the temperature, which may easily take several hundred degrees centigrade, the measuring instrument will certainly be injured.

Supposing now that the watch movement 1 is placed in the box 2 which contains one temperature stabilizing element 3. The temperature variations described above will effect quite different variations of the temperature of the watch, due to the fact that the container 2 with its filling 3 acts as a temperature stabilizing means. The temperature of the watch 1, or any other instrument, will first decrease until it reaches, at the time $t_1$, the temperature of the transformation point of the element 3. The transformation point of the element 3 may be the point or temperature of solidification or freezing of the element 3. The temperature of the watch 1 remains on this temperature and does not change, until the whole element 3 is solidified, which is the case at the time $t_2$. Then the temperature starts to decrease again, until the container 2 is submitted to sun radiation at the time $t_3$. The temperature of the unit 1, 2 then starts rising, until the above-mentioned transformation point is reached at $t_4$. From then until the time $t_5$, the temperature of the container 2 and the measuring instrument 3 does not change because of the latent heat of melting of the temperature stabilizing element 3. At $t_5$, when the whole element 3 is melted, the temperature starts to rise again.

Accordingly, the temperature stabilizing element 3 has in fact the effect of stabilizing the temperature of the watch 1 on a large scale, and this as well in decrease as rising of the environmental temperature.

The time during which the temperature of the measuring element is held constant by the temperature stabilizing element 3, can be calculated as well for the solidification as for the melting of the element 3.

It should be well understood that the expression "transformation point" can, accordingly to the invention, be taken in its most general sense, since it can mean melting, freezing, vaporisation, condensation, etc.

The following table mentions some elements susceptible to be used as temperature stabilizing elements.

| Element | Melting point (°C) | Density (g cm$^{-3}$) | Latent heat of fusion (cal g$^{-1}$) |
|---|---|---|---|
| Cs | 28.6 | 1.9 | 3.9 |
| Ga | 29.8 | 5.9 | 19.2 |
| Hg | −38.9 | 13.6 | 2.7 |
| H$_2$O | 0 | 1 | 79.7 |

The most convenient elements are the gallium and the water, because of the high specific heat of the water and the high density of the gallium. Because of the fact that the volume of both of these elements rises by freezing, it is necessary to provide a container 2 of an appropriate shape and manufacture to avoid its deterioration. In reason of the high vapor pressure of the water, it may be indicated to provide the container 2 with a security value, if the temperature of the watch may reach about 100° C.

Other temperature stabilizing elements that the above-mentioned can be used, for instance metallic alloys such as the ternary eutectic of Ga, In and Sn in the following composition: 62.5% Ga, 21.5% In, 16.0% Sn. The melting point of this alloy is 10.7° C.

The durations of temperature stabilization depend in a large manner from the absorptance and emittance of the casing 2 and the dial of the watch 1. Low powers give long durations of stabilization, because of the fact that the heat flux is low. If only one temperature stabilizing element is used, the temperature of the instrument to be temperature stabilized, can only be stabilized in one direction. Depending on the initial temperature of the instrument, the temperature stabilizing element acts only for a rise or for a decrease of the temperature. So for instant a watch would be temperature stabilized during a heating period if its initial temperature is about 20° C and the container 2 is filled with gallium. The same watch would not be temperature stabilized, if the temperature would decrease. This could be achieved, if the container 2 would be filled with e.g. water.

It is obvious that the watch can be temperature stabilized in both directions, if the container 2 contains both, gallium and water. In this case, the variation of the temperature of the watch 1 can be held between 0° C and 29.8° C, which temperatures correspond to the melting point of the gallium and the water respectively.

It is most preferrable to choose the weight relation Ga/H$_2$O in such a way, that the relation of the total heat of transformation of both elements, corresponds approx. to the relation of the respective heat flux at the transformation points. So it is possible to obtain superior and inferior temperature stabilization durations which are about equal. To achieve this, e.g. 59 g of gallium and 10 g of water can be put into the container 2. The volumes of both elements are 10 cm$^3$. The inconveniences arising from the use of only one temperature stabilizing element can be diminished by using a container 2 and a dial of the watch 1, having each a predetermined and appropriate absorptance and emittance, so that the equilibration temperature of the measuring instrument 1 falls in an admissible temperature range. So, e.g. it is possible to limit the maximum temperature of the watch 1 at a value which is below 80° to 100° C for a perpendicular sun radiation of the dial. It has to be noted, that in practice, such a radiation will not last very long, so that the maximum temperature of the watch will not be reached.

What we claim is:

1. Method for stabilizing the temperature of a timepiece to permit it to operate within its normal working temperature range which comprises introducing the timepiece into a container having therein a body of a temperature stabilizing medium which exhibits at least one heat transformation point, whereby the latent heat of transformation absorbed or emitted by said medium at the time of passage through its transformation point produces a rise or fall in the temperature of said timepiece thereby stabilizing it.

2. The method of claim 1 in which the temperature stabilizing medium is selected from the group consisting of caesium, gallium, mercury and water.

3. The method of claim 1 in which the temperature stabilizing medium is composed of two materials exhibiting two different transformation points whereby said timepiece is stabilized with respect to both rising and falling temperatures.

4. The method of claim 1 in which the temperature stabilizing medium comprises gallium and water.

5. Method for stabilizing the temperature of an instrument to permit it to operate within its normal working temperature range which comprises introducing the instrument into a container having therein a body of a temperature stabilizing medium which exhibits at least one heat transformation point, whereby the latent heat of transformation absorbed or emitted by said medium at the time of passage through its transformation point produces a rise or fall in the temperature of said instrument thereby stabilizing it, said instrument being a timepiece adapted to be carried by an astronaut.

* * * * *

UNITED STATES PATENT OFFICE
CERTIFICATE OF CORRECTION

PATENT NO. : 3,863,707
DATED : February 4, 1975
INVENTOR(S) : JOHANNES GEISS et al It is certified that error appears in the above-identified patent and that said Letters Patent are hereby corrected as shown below:

Foreign Application Priority Date:

February 25, 1971 instead of February 14, 1971

Signed and sealed this 20th day of May 1975.

(SEAL)
Attest:

RUTH C. MASON
Attesting Officer

C. MARSHALL DANN
Commissioner of Patents
and Trademarks